United States Patent [19]

Simon et al.

[11] 4,251,366

[45] Feb. 17, 1981

[54] ADAPTER FOR LABORATORY FILTER

[76] Inventors: Timothy M. Simon, 2801 Rutgers Ave., Long Beach, Calif. 90815; Dennis H. Kunishima, 663 Winslow, Long Beach, Calif. 90814

[21] Appl. No.: 49,444

[22] Filed: Jun. 18, 1979

[51] Int. Cl.[3] .............................................. B01D 35/00

[52] U.S. Cl. ................................... 210/767; 210/406; 210/469; 210/474; 210/541; 422/104

[58] Field of Search ............... 210/406, 469, 474, 541, 210/542, 65; 422/101-104

[56] References Cited

U.S. PATENT DOCUMENTS

| | | | |
|---|---|---|---|
| 3,010,583 | 11/1961 | Kenyon | 210/406 |
| 3,295,686 | 1/1967 | Kauegea | 210/474 |
| 3,437,211 | 4/1969 | Lindsey | 210/406 |
| 3,463,322 | 8/1969 | Gerange | 210/474 |
| 4,135,866 | 1/1979 | Winkler | 422/103 |

*Primary Examiner*—John Adee
*Attorney, Agent, or Firm*—Fulwider, Patton, Rieber, Lee & Utecht

[57] ABSTRACT

An adapter for a laboratory filtration unit includes an annular neck with a smooth outer surface and which slopes inwardly at its inner surface to form a funnel section and which has a collar threaded internally at its lower extremity and located beneath said annular neck. A transverse downwardly disposed ledge is defined between the collar and the funnel section and receives a gasket in abutment therewith. The adapter is utilized to filter a liquid medium from a conventional vacuum assisted laboratory filter unit directly into a conventional liquid storage container.

8 Claims, 4 Drawing Figures

ADAPTER FOR LABORATORY FILTER

BACKGROUND OF THE INVENTION

1. Field of the Invention

The present invention relates to laboratory glassware and plastic ware and the filtration of liquid substances and the storage of filtrate.

2. Description of the Prior Art

There presently exists a laboratory liquid filtration unit which employs a polystrene filter cup with a cover, a support platform located beneath the cup, a nitrocellouse membrane filter positioned between the cup and support platform and a polycarbonate receiver with a receiver cap. U.S. Pat. No. 3,295,686 describes one embodiment of such a device, but another embodiment is also commercially available which has a downwardly opening outlet below the filter. This outlet is slipped over a smooth necked receiver flask. The commercial filter unit includes a side arm arranged for connection to a vacuum source below the level of the filter membrane. Liquid in the filter cup atop the membrane may thereby be drawn more rapidly through the filter by depressurizing the volume below the filter membrane and within the receiver flask.

The commercial embodiment of filter units of this type have several distinct disadvantages. The receiver flasks provided for use in collecting the liquid filtrate are not the flasks typically utilized for the storage of filtrate by laboratory researchers and technicians. Conventional storage bottles for the collection of liquid filtrates are widely employed in laboratories throughout the country. However, these conventional storage bottles are typically formed of glass with an upwardly opening mouth that is threaded externally to receive a screw cap. Two screw cap sizes 38-430 and 33-430 are widely used throughout the laboratory glassware industry. Conventional glass storage bottles of 125 ml, 250 ml, 500 ml and 1000 ml are the storage bottle sizes typically used in research laboratories for the storage of liquid filtrates.

In conventional practice, a vacuum filtration unit of the type described is employed to filter a liquid medium and temporarily collect the liquid filtrate in the smooth necked receiver flask supplied with the filter unit for this purpose. However, in conventional practice in most laboratories the contents of the receiver flask are shortly transferred to the more conventional screw necked storage bottles which are more suitable for storage of liquids. During the course of this transfer, there is a considerable likelihood of contamination of the liquid filtrate due to exposure of the liquid during the transfer process. Furthermore, a transfer of filtrate in this manner alters the volume of filtrate, since a certain amount of the filtrate is enevitably left behind in the temporary filtrate collection receiver. This represents a considerable inconvenience when the stored filtrate is to be utilized, since a recorded measurement of the volume of filtrate orginally collected must be maintained, and that record must be referred to in later work. It is much more convenient, according to the present invention, to merely observe the level of the filtrate in a conventional storage flask, since that level is accurate when the adapter of the invention is utilized.

SUMMARY OF THE INVENTION

The present invention resides in the provision and use of an adapter for a laboratory filter which allows a liquid medium to be filtered and collected directly in a conventional laboratory storage bottle. The adapter has an annular neck with a smooth outer surface and with a radially inwardly sloped funnel section. Below the adapter neck there is a collar that is threaded internally at its lower extremity and is disposed beneath the adapter neck. A transverse downwardly disposed ledge is defined between the inwardly sloped funnel section and the radially outwardly disposed collar.

In use, the adapter of the invention is merely positioned in air tight sealed engagement at the outlet opening of a conventional vacuum assisted filter unit. The collar of the adapter is threadably engaged with the externally threaded mouth of a conventional filtrate storage bottle. A vacuum is drawn through the side arm of the filter unit provided for this purpose as liquid is introduced to the filter unit. The vacuum acts below the level of the filter membrane and within the unoccupied volume of the storage bottle to hasten the passage of liquid through the filter for collection of filtered liquid in the bottle. Preferably, a resilient gasket is disposed in abutment with the ledge of the adapter between the funnel section, and the lip of the storage bottle is directed thereagainst to ensure vacuum sealing.

The invention may be described with greater clarity and particularity by reference to the accompanying drawing figures.

DESCRIPTION OF THE EMBODIMENT

Figure 3:
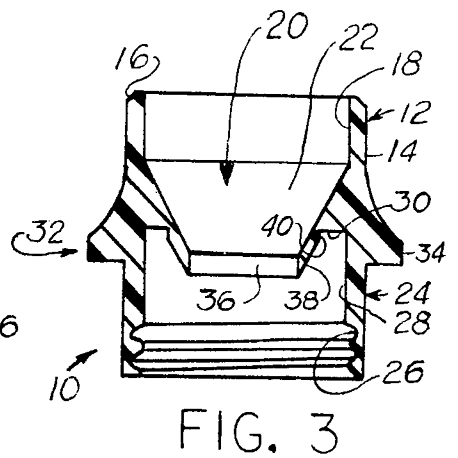
FIG. 3 is a side elevational sectional view of the adapter of FIG. 1.

An adapter 10 is illustrated in FIG. 3 having an annular sleeve-like neck 12 with a smooth finished outer surface 14. The annular neck 12 terminates at its upper extremity in a transverse edge 16 which is beveled about its perimeter downwardly and outwardly relative to the axis of the adapter 10. From the lower extremity of the interior surface 18 of the neck 12 a funnel section 20 is formed having a downwardly and radially inwardly sloped surface 22. A collar 24 is located beneath the neck 12 and is threaded at 26 at the lower extremity of its interior surface 28. The funnel section 20 and the collar 24 are radially separated from each other by an annular gap which defines a transverse downwardly disposed ring-shaped ledge 30.

The adapter 10 is preferably injection molded from polycarbonate plastic as an integral, unitary structure. When formed in this manner, the adapter 10 may be autoclaved without damage.

Figure 2:
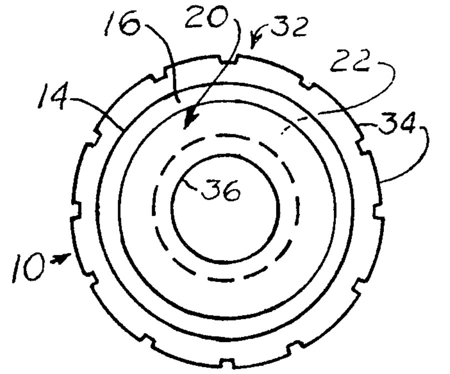
FIG. 2 is a plan view of the adapter of FIG. 1.
Figure 1:
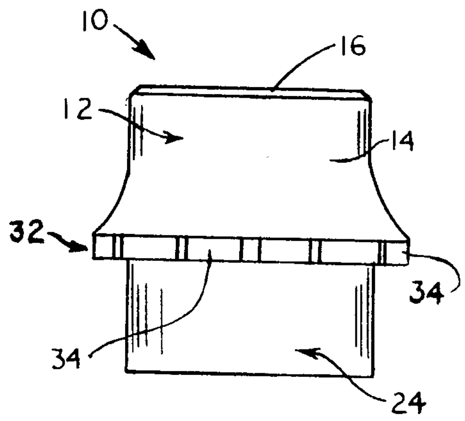
FIG. 1 is a side elevational view of an adapter according to the invention.

The lower extremity of the smooth outer surface 14 of the neck 12 flares outwardly to define a gripping ring 32 with knurls 34 defined thereon as illustrated in FIGS. 1 and 2. The increased gripping ring diameter relative to the outer surface 14 of the neck 12 and the knurled edge of the gripping ring 32 afford a mechanical advantage in screwing and unscrewing the adapter 10 upon a storage receiver.

The lower and inward extremity of the funnel section 20 terminates in a vertical, cylindrical edge surface 36, so that the liquids flowing down the incline of the smooth conical surface 22 of the funnel section 20 are channeled downwardly near the axial center of the adapter 10. The cylindrical edge 36 of the funnel section 20 is undercut sharply upwardly in an upwardly and outwardly inclined frusto conical surface 38. This minimizes any capilliary adhesion of a liquid flowing through the funnel section 20 so as to ensure complete drainage therefrom. The upper edge of the undercut surface 38 terminates in a circular line of demarkation relative to a short cylindrical surface 40 coaxial with the smooth portion of the interior surface 28 of the collar 24. Together, the coaxial surfaces 28 and 40 and the transverse ledge 30 therebetween define a concave, downwardly opening annular recess. A ring-shaped rubber, nontoxic washer 42 is cemented into this annular recess with nontoxic cement, as illustrated in FIG. 4.

The threaded section 26 at the interior surface of the collar 24 is designed with one of the several standard laboratory screw cap sizes typically utilized in association with conventional laboratory storage receivers. Accordingly, preferred embodiments of the invention employ a threaded section 26 having a diameter of 37. 5 milimeters, a thread depth of one millimeter and a thread pitch of four millimeters. The threaded section 26 of the collar 24 and the smooth inner surface 28 thereabove also conform closely to the typical widely used screwcap sizes of 38-430 or 33-430. The first number of the screwcap size is indicative of the diameter of the threaded section 26 of the collar 24 taken between diametrically opposite thread roots. The second portion of the screwcap size designation is indicative of the aggregate height of the threaded section 26 and smooth interior surface 28 of the collar 24.

Figure 4:
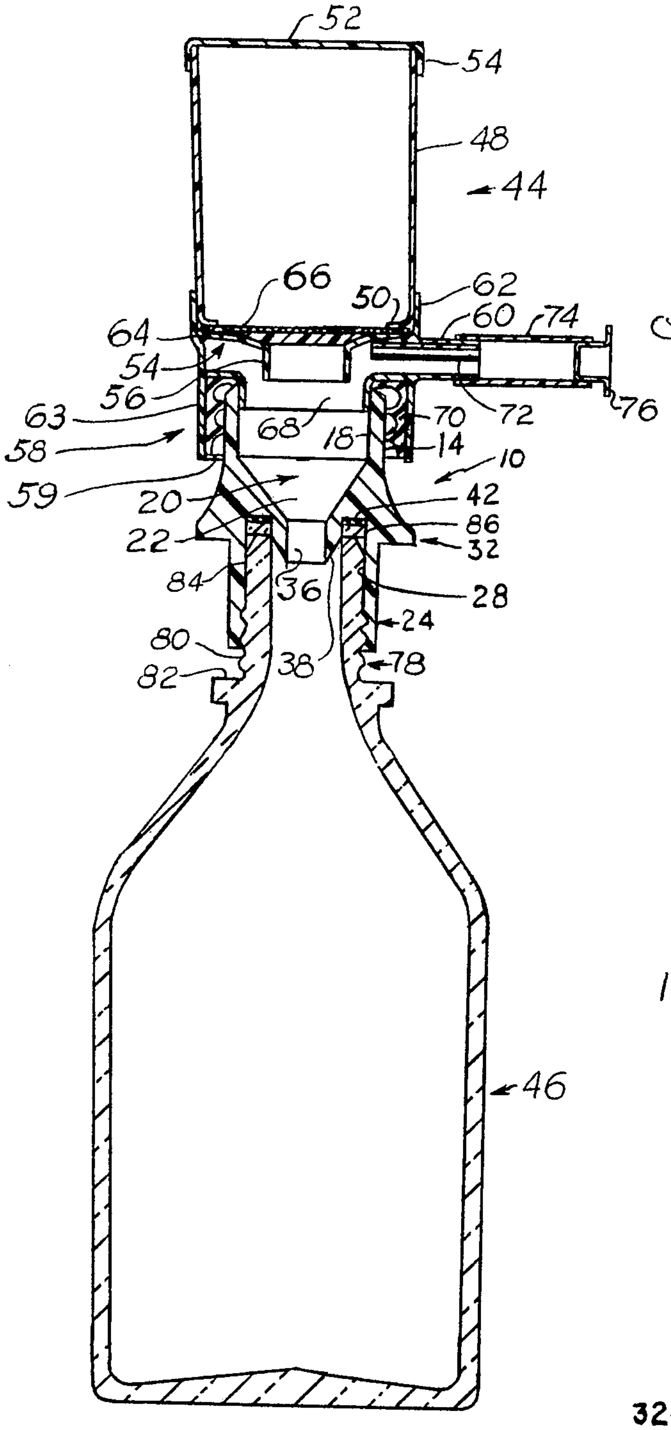
FIG. 4 illustrates the use of the adapter of FIGS. 1–3 in a filtration process.

The use of the adapter 10 is illustrated in FIG. 4. The adapter 10 is interposed between a conventional laboratory filter unit 44 with an outlet opening and a conventional laboratory storage receiver 46. One suitable filter unit 44 is sold commercially in a 500 milliliter size by the Nalge Company, a Division of Sybron Corporation, P.O. Box 365, Rochester, New York 14602. The filter unit 44 includes a slightly tapered polystyrene filter cup 48 with an inwardly curved lip 50 at its lower extremity. The filter cup 48 is closed by a transverse disk-shape cap 52 having an annular surrounding rim 54 that extends downwardly over the upper edge of the cup 48. A support platform 54 is provided and is sloped slightly at its periphery, and more sharply toward its center, and includes a central aperture therein defined with a cylindrical, tubular, down spout 56. The support platform 54 includes a plurality of radially disposed ribs 67 which are angularly displaced from each other about its upper surface. The support platform 54 is held in position transversely across a generally sleeve-shaped holder 58 having a transverse annular side arm 60 extending therefrom. An upper rim 62 of the holder 58 is radially offset from the lower tubular portion 63 of the holder 58 to define a support shelf 64 upon which the support plate 54 rests. A porous transverse membrane filter 66 is disposed transversely across the filter unit 44 and is supported upon the support platform 54 and longitudinally secured between the support platform 54 and the inwardly extending lip 50 of the filter cup 48. The holder 58 terminates in an outlet opening, indicated at 59 in FIG. 4.

Beneath the level of the annular side arm 60 of the holder 58 there is an inwardly disposed cylindrical annular retaining wall 68. An axially extending rubber gasket 70 of inwardly directed serrated profile is disposed within the annular gap defined between the outer surface of the holder 58 and the interiorally disposed annular retaining wall 68. The side arm 60 also contains a small annular tube 72 through which a vacuum may be drawn. If desired, liquid can be poured through the surrounding portion of the side arm 60, but more typically a removable tubular sleeve 74 is secured to the side arm 60 and a plug 76 is mounted therein to prevent contamination of the filtrate.

The adapter 10 of the invention is threadably engaged with a conventional laboratory liquid glass storage bottle or receiver 46. Suitable storage bottles 46 of the type envisioned are manufactured by the Wheaton Glass Company of Millville, New Jersey. Typical bottles of this type are manufactured in sizes of 125 milliliters, 250 milliliters, 450 milliliters, 500 milliliters and 1000 milliliters. The cap size of these bottles is 33-430, with the exception of the 450 and 1000 milliliter bottles, which have a cap size of 38-430.

The body of the storage bottle 46 narrows in its upper section to form an upwardly opening mouth 78. The mouth 78 is externally threaded at 80 immediately above a transverse ring-like ledge 82. Above the threaded section 80 the mouth 78 extends with a smooth cylindrical outer surface 84 which is recessed inwardly at its upper extremity, and atop which an outwardly directed ring-like flange lip 86 is defined.

In the use of the adapter 10 of the invention, the neck 14 of the adapter 10 is inserted into the filter unit outlet 59 so that the neck 14 resides in contact with the outer surface of the annular retaining wall 68, and so that the smooth outer surface 14 of the neck 12 forms a seal with the rubber gasket 70 within the holder 58. The beveled surface 16 at the upper transverse edge of the neck 12 faciliates insertion of the neck 12 of the adapter 10 into the filter unit 44.

The adapter 10 is then engaged with the mouth 78 of the storage bottle 46 by screwing the collar 24 onto the threaded section 80 of the mouth 78 until the lip 86 of the storage bottle mouth 78 advances into contact with the rubber gasket 42 seated against the ledge 30 in the adapter 10. The rubber gasket 42 thereby forms an airtight seal between the adapter 10 and the storage bottle 46.

A vacuum is applied to the transverse vacuum tube 72 in the side arm 60 of the filter unit 44, and a liquid to be filtered is then introduced into the filter cup 48. The vacuum lowers the pressure within the storage receiver 46 and within the adapter 10 beneath the membrane filter 66. This increases the rate of flow of liquid through the membrane filter 66 and hastens the collection of filtrate within the storage receiver 46. As filtrate is dispensed through the spout 56 in the filter unit 44, it is directed by the funnel section 20 of the adapter 10 toward the axial center of the storage receiver 46. This minimizes the contact of liquid filtrate with the interior surface of the upwardly opening mouth 78 of the storage receiver 46, and thereby minimizes the liklihood of loss of filtrate once the adapter 10 is removed.

Vacuum assisted filtration is continued in this manner until the filtrate has passed through the filter unit 44, as directed by the adapter 10 of the invention, into the storage receiver 46. Thereafter, the vacuum is disconnected from the vacuum tube 72 and the adapter unit 10 is threadably disengaged from the mouth 78 of the storage receiver 46. The storage receiver 46 may then be capped in a conventional manner by screwing a cap (not shown) onto the threaded section 80 of the mouth 78 thereof.

By utilizing the adapter 10 of the invention, it can be seen that a liquid can be filtered and filtrate collected directly in a storage receiver 46 without the necessity for temporarily collecting liquid filtrate, and later transferring that filtrate to a storage receiver, such as the storage receiver 46. This not only simplifies laboratory procedure in effectuating filtration processes, but also improves the integrity of the results obtained by decreasing the handling and transfer of the liquid filtrate. This decreases the risk of contamination of the filtrate as well as the liklihood of loss of volume of filtrate.

Undoubtedly numerous other variations and modifications of the invention will become readily apparent to those familiar with laboratory filtration, collection and storage equipment and procedures. Accordingly, the scope of the invention should not be limited to the specific embodiment depicted, but rather is defined in the claims appended hereto.

We claim:

1. An adapter for laboratory liquid filtration consisting essentially of a unitary plastic structure having an annular neck with a smooth outer surface and having a downwardly and radially inwardly sloped funnel section terminating in a cylindrical edge which is undercut sharply upwardly and outwardly as an inclined frusto conical surface, and spaced radially outwardly from said funnel section there is a collar which is threaded internally at its lower extremity and located beneath said neck, said funnel section and said collar defining a transverse downwardly disposed ledge across the space therebetween, and an annular fluid-tight sealing gasket is located in the space between said funnel section and said neck in fluid tight engagement with said ledge, and said gasket is engaged with and compressed by the end of an externally threaded mouth of a laboratory liquid storage bottle with which said collar may be releasably and threadably engaged.

2. An adapter according to claim 1 further characterized in that the size of threads on said collar is 33-430.

3. An adapter according to claim 1 further characterized in that the size of threads on said collar is 38-430.

4. An adapter according to claim 1 further characterized in that said funnel section extends downwardly coaxially within the upper extremity of said collar to form said ledge as the deepest part of a concave, downwardly opening annular recess.

5. An adapter according to claim 1 formed as a unitary structure of polycarbonate plastic.

6. An adapter according to claim 1 further characterized in that said smooth outer surface of said neck flares downwardly and outwardly to a gripping ring larger in diameter than said collar.

7. An adapter according to claim 4 further characterized in that said annular sealing gasket is cemented to said ledge.

8. A method of collecting liquid filtrate for storage utilizing a laboratory filter unit having a transverse filter, a downwardly opening outlet below said filter comprising an outer sleeve with a flexible seal disposed therewithin and with an annular guide located concentrically therewithin, and also utilizing a liquid storage container having an externally threaded upwardly opening mouth, and an adapter consisting essentially of an annular neck with a smooth outer surface and having a downwardy and radially inwardly sloped funnel section terminating in a cylindrical edge which is undercut sharply upwardly and outwardly in an inclined frusto conical surface, and spaced outwardly from said funnel section there is a collar threaded internally at its lower extremity and located beneath said neck, said funnel section and said collar defining a transversely downwardly disposed ledge in the space therebetween, and an annular fluid tight sealing gasket is located in the space between said funnel section and said neck in fluid tight engagement with said ledge, comprising:

sliding said adapter into engagement with said filter unit with said adapter neck extending into said filter unit opening outlet and with said flexible seal residing in contact with the smooth outer surface of said adapter neck, threadably engaging said adapter unit collar with said mouth of said storage container so that the end of said mouth of said storage container compresses and bears against said fluid tight sealing gasket, exerting a vacuum on said laboratory filter unit below said transverse filter to draw a liquid to be filtered through said filter unit while sealing said adapter unit against contamination at said flexible seal and at said gasket, and collecting the filtrate of said filter unit in said storage container, and subsequently measuring the bacterialogical content of said filtrate.

* * * * *